(12) United States Patent
Schulz

(10) Patent No.: US 9,404,042 B2
(45) Date of Patent: Aug. 2, 2016

(54) THERMAL REACTOR

(75) Inventor: Klaus-Peter Schulz, Auggen (DE)

(73) Assignee: Pyrum Innovations International S.A., Luxembourg (LU)

( * ) Notice: Subject to any disclaimer, the term of this patent is extended or adjusted under 35 U.S.C. 154(b) by 554 days.

(21) Appl. No.: 13/977,180

(22) PCT Filed: Jan. 3, 2012

(86) PCT No.: PCT/DE2012/100002
§ 371 (c)(1),
(2), (4) Date: Jun. 28, 2013

(87) PCT Pub. No.: WO2012/092924
PCT Pub. Date: Jul. 12, 2012

(65) Prior Publication Data
US 2013/0327630 A1    Dec. 12, 2013

(30) Foreign Application Priority Data
Jan. 5, 2011    (DE) .......................... 10 2011 000 037

(51) Int. Cl.
*C10B 1/04* (2006.01)
*C10B 53/07* (2006.01)
*C10G 1/10* (2006.01)

(52) U.S. Cl.
CPC . *C10B 1/04* (2013.01); *C10B 53/07* (2013.01); *C10G 1/10* (2013.01); *C10G 2300/1003* (2013.01); *Y02P 20/143* (2015.11)

(58) Field of Classification Search
CPC .......... C10B 1/04; C10B 53/07; C10B 47/18; C10B 47/20; C10B 19/00; C10G 1/10
USPC ......... 202/120, 221, 225; 201/34, 19; 432/95, 432/102
See application file for complete search history.

(56) References Cited

U.S. PATENT DOCUMENTS

| 4,007,014 A * | 2/1977 | Matsumoto ................ B01J 8/12 201/34 |
| 8,328,992 B1* | 12/2012 | Swain ..................... C10B 47/18 202/108 |
| 2010/0175981 A1* | 7/2010 | Merrell .................... C10G 1/02 201/34 |

FOREIGN PATENT DOCUMENTS

| GB | 1 558 895 A | 1/1980 |
| JP | 2009-166040 A | 7/2009 |
| WO | WO 2010/127664 A1 | 11/2010 |

OTHER PUBLICATIONS

International Search Report of PCT/DE2012/100002, Jun. 25, 2012.

*Primary Examiner* — Jill Warden
*Assistant Examiner* — Joye L Woodard
(74) *Attorney, Agent, or Firm* — Collard & Roe, P.C.

(57) ABSTRACT

A thermal reactor for the continuous thermolytic recycling of granules of scrap tires, vulcanization residues and waste plastics, and of similar products features a feed portion, a central heating-zone portion and a discharge portion arranged vertically one below the other. An extraction pipe is located centrally in the central heating-zone portion of the thermal reactor, the lateral surface of the extraction pipe featuring numerous holes and/or slits for withdrawal of the vaporized short-chain hydrocarbon compounds being formed, and the extraction pipe having conical bells pushed onto it one above the other. A device withdraws the vaporized hydrocarbon compounds from the extraction pipe. Radially arranged heating plates are provided on the lateral surface of the reactor in its central heating-zone portion, the heating plates being arranged at the heating levels, which lie one above the other, such that the plates are mutually offset.

6 Claims, 4 Drawing Sheets

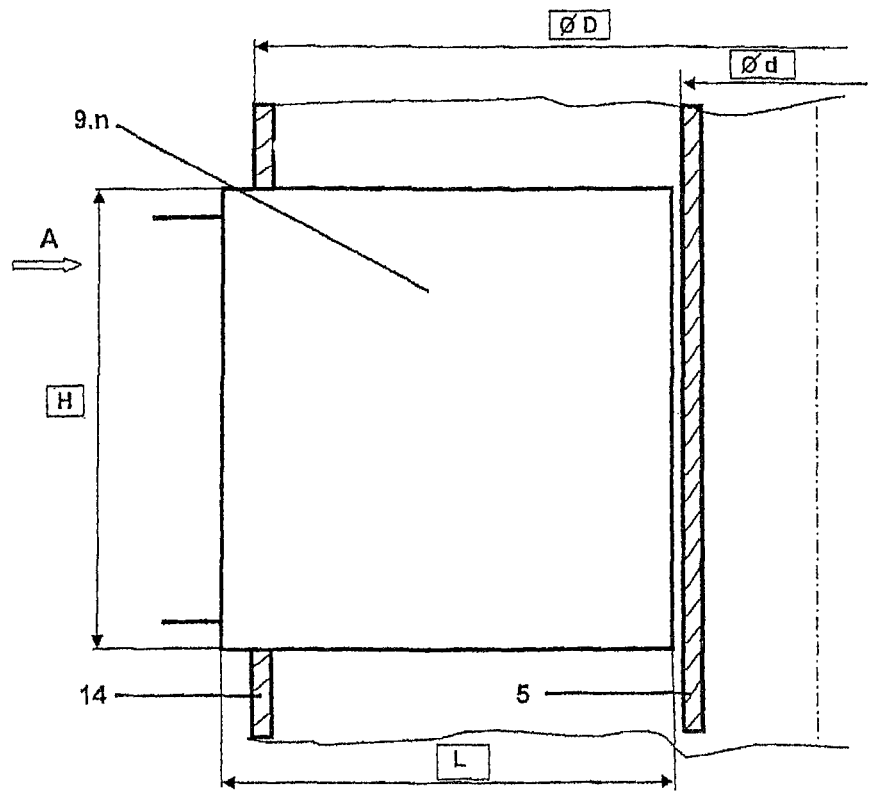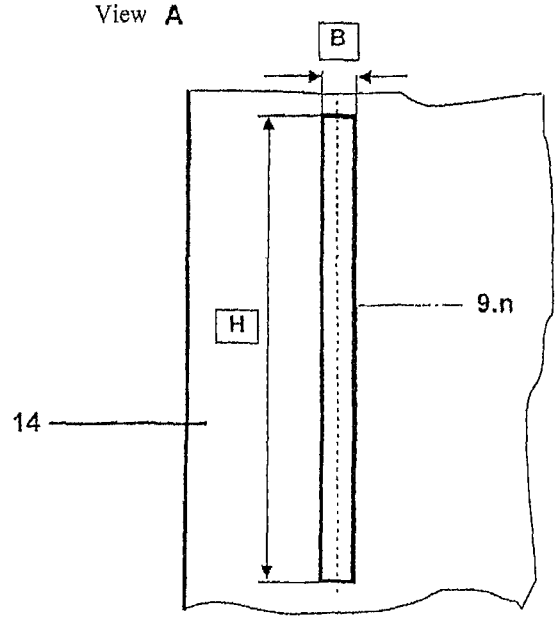

THERMAL REACTOR

CROSS REFERENCE TO RELATED APPLICATIONS

This application is the National Stage of PCT/DE2012/100002 filed on Jan. 3, 2012, which claims priority under 35 U.S.C. §119 of German Application No. 10 2011 000 037.2 filed on Jan. 5, 2011, the disclosures of which are incorporated by reference. The international application under PCT article 21(2) was not published in English.

BACKGROUND OF THE INVENTION

1. Field of the Invention

The invention relates to a thermal reactor for the continuous thermolytic recycling of granules of scrap tires, vulcanization residues and waste plastics, and of similar products, said thermal reactor featuring a feed portion, a central heating-zone portion and a discharge portion arranged vertically one below the other.

2. Description of the Related Art

According to the prior art, recycling of granulated scrap tires, vulcanization residues and waste plastic for purposes of re-use is mostly performed in rotating tubular reactors and less often in fluid(ized) bed reactors or entrained-bed reactors as these are still at the developmental stage. Shaft or vertical reactors, as they are termed, have hitherto been used primarily as heat exchangers for the heating, sintering and cooling of pourable bulk solids or for the pyrolysis of organic waste in order to generate refuse-derived fuels. From the WO 2010/127664 A1, a multi-stage, energy self-sufficient and continuously operating pyrolysis method for the fractionated recovery of valuable substances and energy from pourable, cross-linked organic compounds of high molecular weight, in particular from granules of scrap tires, sealing profiles and other plastic materials, and an apparatus for carrying out said method, are known. In order to develop an energy self-sufficient, continuously operating pyrolysis method for pourable organic granules according to the preamble, it is proposed there that the granules pass gravimetrically through a vertical, multi-stage pyrolysis reactor from top to bottom, said granules being heated to process temperatures that can be set incrementally to different values ranging from 300 to 1,200° C. and being pyrolyzed. Oil and gas compounds are recovered via subsequent fractionated condensation of the pyrolysis vapors, while downstream motor-based use of the pyrolysis gas generates the energy required for the pyrolysis process.

SUMMARY OF THE INVENTION

The object of this invention is to develop a continuously operating thermal reactor for a pyrolysis process of such kind, with which granules of scrap tyres, vulcanisation residues and waste plastics can be subjected to continuous thermolytic recycling without additional, motor-driven rotary conveying and mixing devices or pneumatic loosening-up devices.

This object is established according to the invention in that
the thermal reactor features a feed portion, a central heating-zone portion and a discharge portion arranged vertically one below the other,
an extraction pipe is located centrally in the central heating-zone portion of the thermal reactor, the lateral surface of said extraction pipe featuring numerous holes and/or slits for withdrawal of the vaporized short-chain hydrocarbon compounds being formed, and the extraction pipe having conical bells that have been pushed onto it one above the other, and means being provided for withdrawing the vaporized hydrocarbon compounds out of the extraction pipe, and
a multiplicity of radially arranged heating plates are disposed on the lateral surface of the reactor in its central heating-zone portion, the heating plates being arranged at the heating levels, which lie one above the other, such that the plates are mutually offset.

It has been found within the scope of the invention that it is possible to continuously recycle granules of scrap tires, vulcanization residues and waste plastics in a vertical thermal reactor of this kind, despite the poor thermal conductivity of these substances, because they are subjected to homogeneous mixing and heating. The substances pass through the vertical reactor from top to bottom in an oxygen-deficient atmosphere of sub-atmospheric pressure and are broken down thermally into short-chain, vaporous hydrocarbon compounds and into solids (coke), which are valuable raw materials.

The material is metered into the thermal reactor via the feed portion. In the central heating-zone portion, the thermolysis products formed undergo fractionated separation into solids and vapour at temperatures preferably between 500° C. and 600° C. The vaporized hydrocarbon compounds in the central heating-zone portion are extracted and subsequently condensed out to oil compounds of different compositions and to permant gas. Coke-like solid matter formed during the thermolysis process collects in the discharge portion and is withdrawn from the thermal reactor via a solids-discharge means.

It is within the scope of the invention that short and long heating plates are arranged alternately both within a heating level and from one heating level to the neighbouring heating level.

This measure effects good mixing and homogeneous heating of the material thanks to the offset arrangement of the heating plates.

A preferred refinement of the invention consists in that the heating plates can be pushed into, and removed from, correspondingly-sized slots in the thermal reactor's lateral surface.

This permits rapid maintenance and/or rapid exchange of defective plates.

It is to advantage that the heating plates can be heated electrically.

In this connection, it is to advantage that means to control the temperature profile in the thermal reactor and to individually adjust the temperature of each heating plate are provided.

Another embodiment of the invention consists in that the means for withdrawing the vaporized hydrocarbon compounds from the extraction pipe is configured as a short vapour-discharge pipe, which is connected to a polycondensation unit.

BRIEF DESCRIPTION OF THE DRAWINGS

The invention is explained in detail below by reference to drawings.

The drawing in

FIG. 4 and view A show an electrically heated heat-exchanger plate and a detailed view thereof

DETAILED DESCRIPTION OF THE PREFERRED EMBODIMENTS

The thermal reactor (1) is configured according to the invention as a vertical pressure vessel comprising a plurality of parts flanged together. On account of its high temperature loads, it is made entirely of heat-resistant steel or alloys such as 1.4828, 1.4841, AVESTA 253 MA, Nicrofer 45 TM or similar materials.

Figure 1:
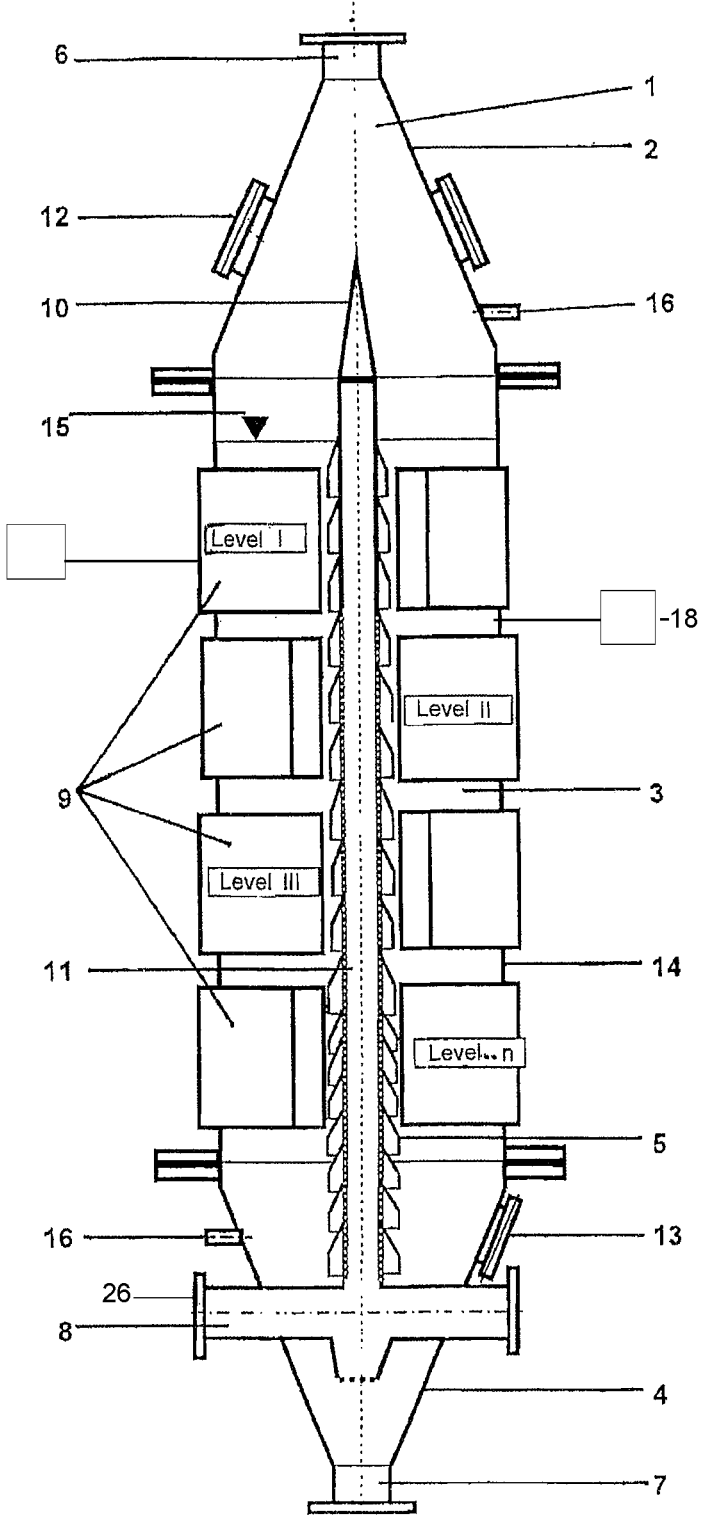
FIG. 1 shows a longitudinal section through a thermal reactor according to the invention, without a catalyst device

FIG. 1 shows a longitudinal section through the thermal reactor (1) according to the invention and reveals the basic design principle. Viewed from top to bottom, the thermal reactor (1) features a truncated feed portion (2) adjoined by a central cylindrical heating-zone portion (3) which is adjoined in turn by a truncated discharge portion (4).

In order to minimize penetration of oxygen into the thermal reactor (1), which is undesirable for thermolysis technology, the granule feed and discharge into and of the reactor (1) are effected via a material feed system. The material feed system preferably consisits of a shock-pressure resistant cellular wheel sluice with an easily detachable rotor, means to regulate the rotary speed via a frequency converter, an inerting connection, and a gate value for bulk solids.

The granules are metered into the thermal reactor (1), via the short solids-infeed pipe (6), from a granule hopper above the reactor (1). A material distributor (10) distributes the granules uniformly over the entire circular cross-section of the reactor (1). A packed-bed column, which is a function of the granule size and type of material, forms in the interior of the thermal reactor (1) and moves from top to bottom through the thermal reactor (1) as a result of gravity. The column of granules is confined by the reactor's cylindrical lateral surface (14), the built-in components (5), the long and short radial heating plates (9) attached alternately to the lateral surface (14), which project into the interior of the reactor (1), and the fill level in the reactor (1).

The column of granules is divided into small sections resembling pieces of cake by the radial arrangement of the heating plates (9) and the offset arrangement thereof at the heating levels disposed one above the other. Good mixing of the granules, and thus uniform heating thereof, is effected, for one, by the offset arrangement of long and short heating plates (9) and, for another, by the internal built-in components (5) in the heating-zone portion (3) of the thermal reactor (1), which are configured as displacement and circulation components and even out the speed profile of the granules in the thermal reactor (1).

Thanks to the close contact which the granules are forced to make with the preferably electrically heated heating plates (9), they can be heated steplessly to reaction temperatures adjustable up to 950° C. and broken down thermally. The reaction temperatures are controlled via a process control system (21) as a function of the kind of material, the granule size and their heat-conductng properties. The temperature profile in the thermal reactor (1) may be varied over the reactor cross-section and the height of the entire central heating-zone portion (3), and the temperature of each heating plate (9) may be regulated individually.

The granule fill level in the thermal reactor (1) is measured and controlled via a y fill-level measuring and control device (15). The granule residence time in the thermal reactor (1) at a specified reaction temperature, and thus the degree to which multiple bonds in the hydrocarbon compounds are broken, are also determined and controlled automatically by the process control system (21).

The central extraction pipe (11) installed in the centre of the thermal reactor (1) has numerous holes and/or slits in its lateral surface, through which the vaporized short-chain hydrocarbon compounds formed are withdrawn. These vapours flow transverse to the flow of solids, i.e. they form a cross-flow. To prevent the withdrawal of granules or dust, the extraction apertures are covered over and shielded by conical bells, referred to as internal built-in components (5), which are pushed onto the extraction pipe (11) and are disposed one above the other. The vapours formed during thermolysis reach the extraction apertures through the open underside of the bells and enter the extraction pipe (11) through the apertures. They are then conveyed by virtue of negative pressure averaging −50 mbar to −75 mbar, via the vapour discharge means (8), to a polycondensation unit (26), where they condense out to oil compounds of different compositions, viscosities and calorific values, and to permanent gas.

The solids fraction of approx. 45 to 52 wt. % coke granules obtained from the thermolysis of scrap-tire granules consists of approx. 70 to 90% pure carbon and approx. 10 to 25% inorganic fillers that were added during new-tire manufacture. The mean net calorific value NCV is approx. 23 to 30 MJ/kg, and the mean BET surface area approx. 80 to 120 $m^2/g$. The coke granules collect in the truncated discharge portion (4) and are supplied, via the short solids discharge pipe (7) and a material discharge system constructed in the same way as the material feed system but designed for high temperatures, to a water-cooled cooling coil, cooled to room temperature and stored temporarily in storage devices.

Figure 2:
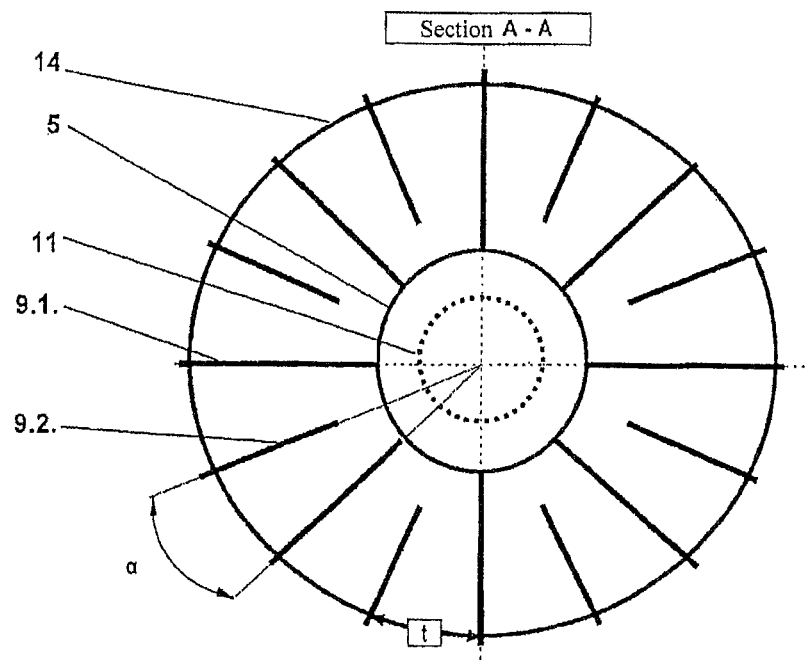
FIG. 2 shows a cross-section (section A-A) through the upper portion of the thermal reactor shown in FIG. 1.

FIG. 2 shows the distribution principle according to the invention, comprising long and short heating plates (9.1, 9.2) inside the thermal reactor (1). The spacing t between the heating plates (9.1, 9.2) at the periphery of the thermal reactor (1) is determined by the thermal conductivity λ of the granular material to be processed and the granule size.

EXAMPLE

Assuming the maximum depth to which heat penetrates the granule layer is 100 mm and the circumference of the thermal reactor (1) is 4,800 mm, the number of heating plates required is n=4 800 mm: 100 mm=48 heating plates.

The angle $\alpha_t$ subtended by two adjacent plates is $\alpha_t$=360°: 48 heating plates=7.5°

The design principle accordingly dictates that 24 long and 24 short heating plates (9.1; 9.2) would be needed per heating level. The overall number and heating capacity of the heating plates are calculated according to the general design rules for heat exchangers.

Figure 3:
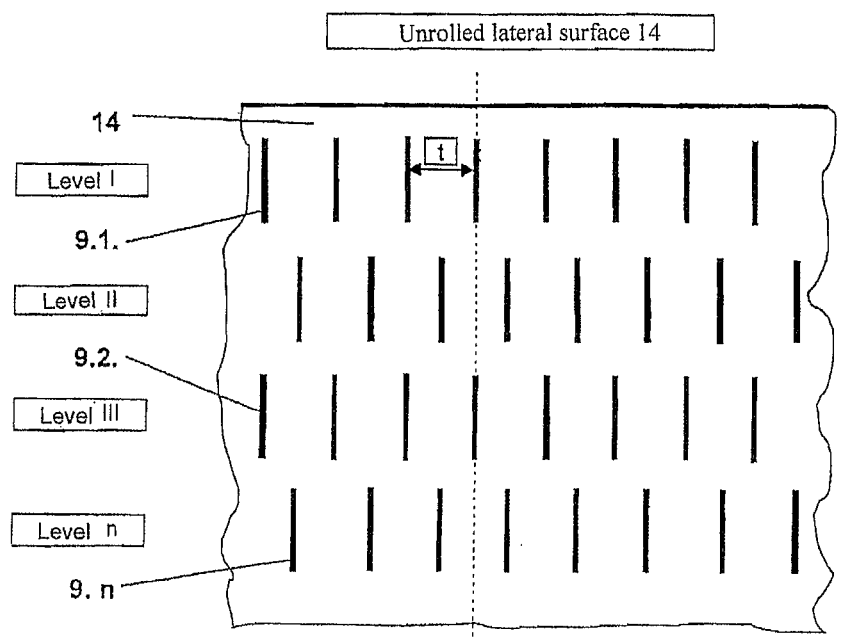
FIG. 3 shows the unrolled lateral surface of the thermal reactor according to the invention, with the arrangement of offset heating-plate levels.

In FIG. 3, the reactor's lateral surface (14) has been unrolled to show the offset arrangement principle for the heating plates (9.1; 9.2) at the heating levels. The offset arrangement of heating plates (9.1, 9.2) can be seen clearly. The arrangement and configuration of the electrically heated heat-exchanger plates (9 . . . 9n) attached radially to the lateral surface (14) effect optimal heat transfer into the granules, as both the spacing t between the heat-exchanger plates (9 . . . 9n) in the horizontal and the spacing between the heating levels in the vertical and their offset arrangement are configured as a function of the size and kind of granules to be processed and accordingly lead to very high levels of efficiency.

FIG. 4 shows how the heating plates (9.1; 9.2) are attached to the reactor's lateral surface (14). The heating plates (9.1, 9.2) are inserted into correspondingly sized slots in the lateral surface (14) of the thermal reactor (1) and can be withdrawn again individually from the lateral surface (14) of the thermal reactor (1) for maintenance purposes or to be exchanged.

Figure 5:
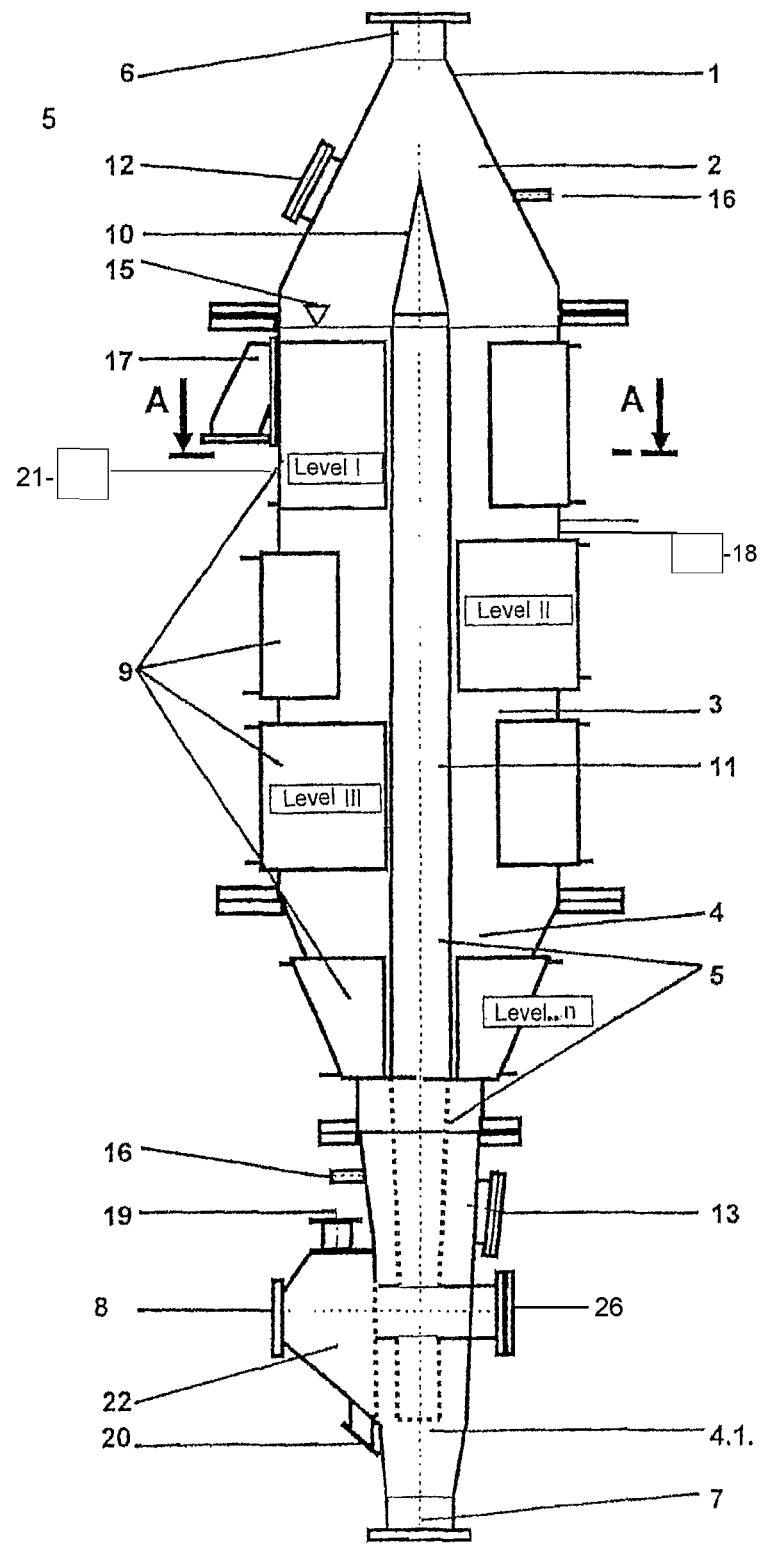
FIG. 5 shows a longitudinal section through a thermal reactor according to the invention, including a catalyst device

FIG. 5 shows a thermal reactor (1) which, according to the invention, offers the possibility of additional catalytic treatment for the vaporized hydrocarbons. In principle, the assembly and configuration of the thermal reactor (1) is comparable with that of FIG. 1. The only difference is that the discharge portion (4) is modified to the effect that an additional row of heating plates (9) is fitted therein, which guarantee a temperature of 600° C. for the vapours formed. In the discharge portion (4.1), a packed-bed filter (22) for catalysts is shown, in which the vapours are in direct contact with the catalyst granules at the point where the vapours are formed. The temperatures required for the vapour cracking processes are controlled by the process control system. It is important in this context that a minimum temperature of approx. 550° C. and a negative pressure of at least 50 mbar be maintained.

As some vapour components already begin to condense out at temperatures of approx. 450° C. to 500° C. and, together with the ultrafine dust formed in the plant, form matter that tends to carbonize, there is a risk that the vapour line leading to the polycondensation unit (26) will clog up. Electrically heated heating mats or heating wires configured with all-over high-temperature insulation are useful as an additional protective measure against these occurrences.

Mixed catalysts commonly used in the petrochemical industry, such as $SiO_2/Al_2O_3$, $Cr_2O_3/Fe_2O_3$ and zeolites, have proved suitable as catalysts for the packed-bed filter (22).

For strength-related reasons and on account of the considerable linear expansion in the operating state, the reactor (1) is suspended by supporting brackets (17) at the point where its tensile strength is greatest, in the upper portion of the heating zone (3).

According to the invention, the thermal reactor (1) is engineered in flanged form and is sub-divided into process sections. A thermal reactor (1) engineered in this way offers technical and technological advantages, such as easier manufacture, repair and exchange possibilities, better handling during transport and assembly and a high degree of flexibility with respect to the products to be processed, easier correction in the event of capacity ramp-up and modifications in the nature and proportioning of the desired end products.

The structural design of the thermal reactor (1) was deliberately kept very simple in the invention and was configured to facilitate maintenance and repair by means of practical features such as manholes (12) in the upper reactor portion (2) and manholes (13) in the lower reactor portion (4) and by designing the internal built-in components (5), material distributor (10) and central extraction pipe (11) such that they are easy to remove.

This thermolysis reactor lends itself to an environmentally friendly, residue-free and energy self-sufficient recycling process, which boasts a high level of technological flexibility in terms of the size of the granules and the kinds of materials to be processed, easier correction in the event of capacity ramp-up and modifications in the nature and proportioning of the end products.

The permanent gas, which has a net calorific value n.c.v. of 30 to 45 $MJ/m^3$ and an average methane number of 60, may be used for the purpose of a self-sufficient energy supply by converting the gas to electricity in a gas motor/generator unit, as a rule in a cogeneration unit. The solid matter, which is composed of approx. 45 to 52 wt. % pure carbon in the form of granules and soot, with a mean BET surface area of 80 to 120 $m^2/g$ and a mean net calorific value n.c.v. of approx. 23 to 30 HJ/kg, and of approx. 10 to 25 wt. % inorganic fillers, can be supplied to the tire and/or rubber industries for re-use.

The wide range of thermolytic oil fractions set free during thermolysis in the thermal reactor (1) and in the polycondensation unit (26) may be supplied to oil refineries, the plastics, paint or rubber industries, producers of heating oil or fuel and to carbon-black manufacturers for further processing.

LIST OF REFERENCE NUMERALS

1 Thermal reactor
2 Feed portion
3 Central heating-zone portion
4 Discharge portion
5 Internal built-in components
6 Short solids infeed pipe
7 Short solids discharge pipe
8 Vapour discharge means
9 Heating plates
10 Material distributor
11 Central vapour extraction pipe
12 Upper manholes
13 Lower manholes
14 Cylindrical lateral surface
15 Fill-level measuring and control device
16 Inerting connection
17 Supporting brackets
18 Measuring and control devices for temperature, pressure and oxygen content
19 Catalyst feed
20 Catalyst discharge
21 Process control system (PCS) with stored program controller (SPC)
22 Packed-bed filter
26 Polycondensation unit

The invention claimed is:

1. A thermal reactor having a thermal reactor lateral surface, said thermal reactor comprising:
   (a) a feed portion;
   (b) a central heating-zone portion arranged vertically below the feed portion and comprising
      a centrally-located extraction pipe having an extraction pipe lateral surface comprising a plurality of apertures for withdrawal of vaporized hydrocarbon compounds,
      a plurality of conical bells disposed one above the other on the central-located extraction pipe,
      a withdrawing device for withdrawing the vaporized hydrocarbon compounds from the centrally-located extraction pipe, and
      a plurality of radially-arranged mutually-offset heating plates arranged on the thermal reactor lateral surface at heating levels lying one above the other, and
   (c) a discharge portion arranged vertically below the central heating-zone portion.

2. The thermal reactor according to claim 1, wherein the plurality of heating plates comprise short and long heating plates arranged alternately both heating level and from one heating level to the neighboring heating level.

3. The thermal reactor according to claim 1, wherein the heating plates are removably disposed in correspondingly dimensioned slots in the thermal reactor lateral surface.

4. The thermal reactor according to claim 1, wherein the heating plates are heating electrically.

5. The thermal reactor according to claim 1, further comprising a temperature control to control the temperature profile in the thermal reactor and to individually adjust the temperature of each heating plate.

6. The thermal reactor according to claim 1, wherein the withdrawing device comprises a vapor-discharge pipe connected to a polycondensation unit.

* * * * *